United States Patent [19]

Saluski

[11] Patent Number: 4,713,791
[45] Date of Patent: Dec. 15, 1987

[54] REAL TIME USAGE METER FOR A PROCESSOR SYSTEM

[75] Inventor: Robert A. Saluski, Phoenix, Ariz.

[73] Assignee: GTE Communication Systems Corporation, Phoenix, Ariz.

[21] Appl. No.: 653,190

[22] Filed: Sep. 24, 1984

[51] Int. Cl.[4] .............................................. G06F 11/32
[52] U.S. Cl. ................................................... 364/900
[58] Field of Search ... 364/200 MS File, 900 MS File, 364/551; 340/870.02

[56] References Cited

U.S. PATENT DOCUMENTS

| | | | |
|---|---|---|---|
| 4,363,441 | 12/1982 | Feinberg | 364/464 X |
| 4,471,348 | 9/1984 | London et al. | 364/551 X |
| 4,484,269 | 11/1984 | Crain | 364/200 |
| 4,511,961 | 4/1985 | Penton | 364/200 |

Primary Examiner—Thomas M. Heckler
Attorney, Agent, or Firm—Frank J. Bogacz; Peter Xiarhos

[57] ABSTRACT

This invention is a device which permits the percentage of real time consumed by software tasks of a telecommunications switching system or other process controller to be measured and displayed on a percentage meter. The relative percentages of different real time tasks are displayed by the relative intensities of particular lamps mounted on a control panel. The real time usage of non-standard, user defined, software tasks may be selected for display on the meter.

20 Claims, 4 Drawing Figures

REAL TIME USAGE METER FOR A PROCESSOR SYSTEM

BACKGROUND OF THE INVENTION

This invention pertains to real time usage of processing systems and more particularly to apparatus for measuring and visually displaying the amount of real time consumed by tasks of a processing system.

Current central office switching systems provide the ability to display the amount of real time utilized by the system. Systems such as, Traffic Service Positions System (TSPS), No. 2 EAX, GTD-3-EAS and GTD-4600 provide the ability to display the cumulative amount of real time utilized by the system. These systems are manufactured by GTE Communication Systems Corporation, which is the assignee of the present invention.

These systems and others provide for displaying only the total cumulative amount of real time used by the system or a certain predefined subset of these tasks. These systems do not permit selective displaying of relative percentage of different types of software tasks by the meter. Also, these systems do not provide the ability for displaying real time percentage sums of certain selected types of software tasks. For example, these systems do not provide the ability to display the amount of real time consumed by call processing and diagnostics cumulatively.

It is important for proper system performance to monitor the amount of real time used, which is beyond a predefined threshold limit. Previous methods to achieve this end have employed a system software monitor and to first, print a report or; second, to increment a counter for such an occurrence. The disadvantage of the first method is that the processing required to print a report also requires real time which detracts from the systems capability to perform its normal switching functions. Using the second method, incrementing a counter will provide an indication that the overshoot of the predetermined amount has occurred, but does not provide an instantly recognizable indication of it to the system's user. These systems do not address the problem of providing an instantaneous indication that a time overshoot exceeding a threshold level has occurred without consuming additional system real time.

SUMMARY OF THE INVENTION

A real time usage meter is a display apparatus which allows the percentage of available time utilized by different software tasks of a processing system to be monitored by the system's user. The display apparatus includes a percentage meter device and a number of light emitting diodes (LEDs).

Software provides an indication of which tasks are executing (running) on the processing system by maintaining a status display data word and transmitting this word to the usage meter hardware via a data bus of the processor.

Storage devices are connected to the processor system and operate in response to the system to store the status display data word. The status display data word reflects the type of task which is running on the system. A gating arrangement is connected between the storage devices and the display apparatus. The gating arrangement operates to transmit the stored status display data word to a number of LED devices, which correspond to the different types of system tasks.

A switching arrangement is connected between the gating arrangement and the percentage meter device. The switching arrangement operates in response to the status display data word to selective combine the values of status bits of the data word together to derive a signal to drive the percentage meter device.

DESCRIPTION OF THE PREFERRED EMBODIMENT

Figure 1:
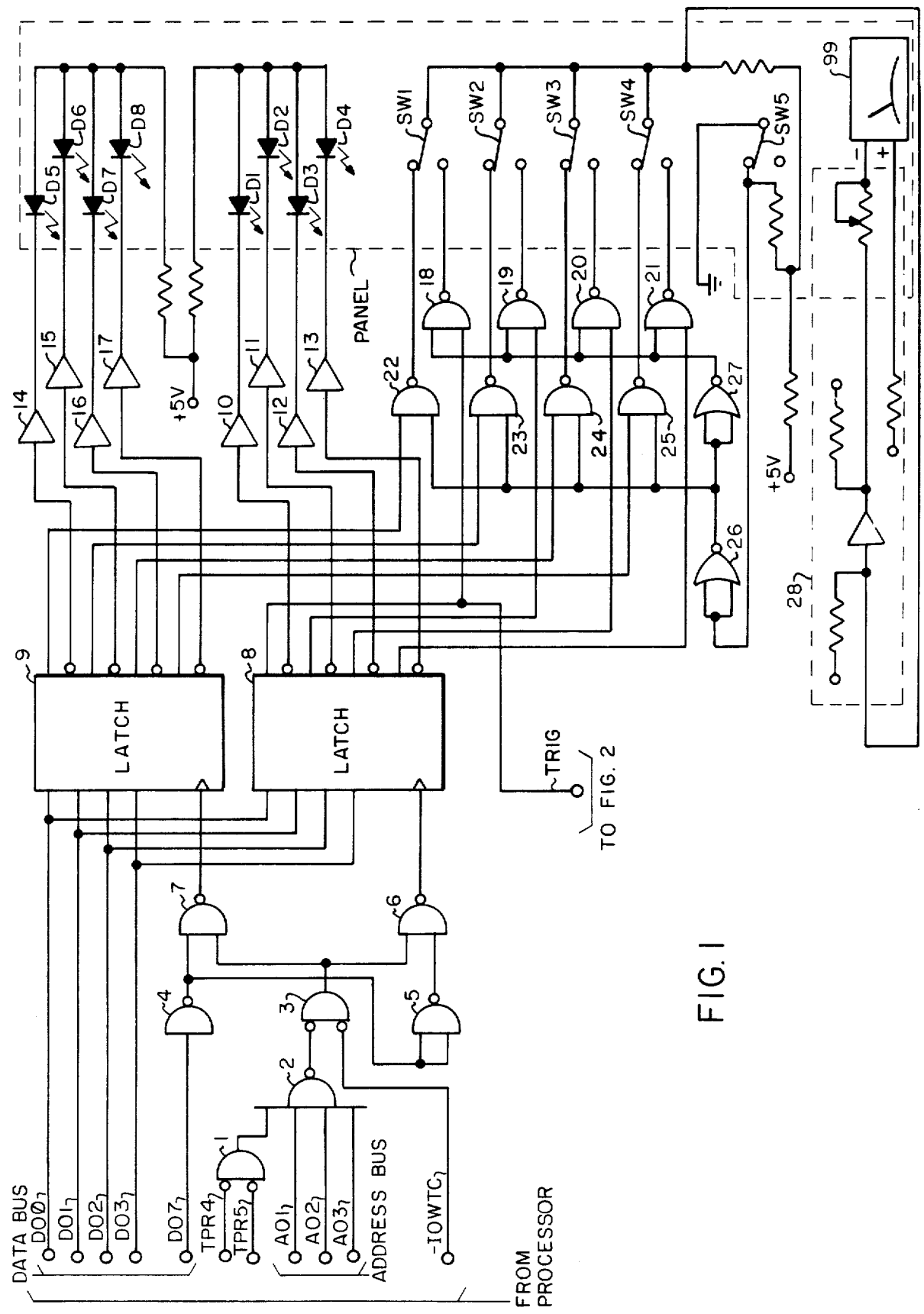
FIG. 1 is a schematic diagram of the control logic of the real time usage meter.

In order to implement the present invention, a combination of additional hardware logic and modifications to software is required. Referring to FIG. 1, a control portion of the real time usage meter is shown. A portion of the address bus, address leads A01–A03, is connected to NAND gate 2. Two leads, TPR4 and TPR5, connect the processor NOR gate 1. The TPR4 and TPR5 leads are status bits of the processor which indicate that an input/output operation is in progress and that address bits A4 through A19 are in a logic 0 condition. The output of NOR gate 1 is connected as an input to NAND gate 2. A signal on the IOWTC lead is logically NORed by gate 3 with the output of gate 2. The output of NOR gate 3, when in a logic one state indicates that a write operation to the real time meter is in progress by the processor.

Eight bits of information regarding real time usage of the software are kept and made available four bits at a time on data bus D00 through D03 during the write cycle. Data bit D07 indicates which four bit quantity of the eight bits of real time usage indicators is currently available on D00–D03. When data bit D07 is at logic 0, bits D00–D03 are strobed into latch 9 by the operation of NAND gate 7, which is connected to invertor 4. When data bit D07 is at logic 1, the output of gate 5 is at logic 1 and operates NAND gate 6 to again strobe data bits D00–D03 (the next 4 bits) of software usage status into latch 8. Software added to the switching system performs the setting and clearing of the data bits transmitted to latches 8 and 9.

Each of the bits stored in latches 8 and 9 corresonds to a particular type of software task being performed. The bit for a particular type of task is set when the task begins execution, and is cleared when the particular task ends execution. The data stored in these latches is constantly displayed on the lamps of the display panel. The data bits stored in latch 8 are standard defined monitoring points for the 4 types of tasks for the switching system. The data bits stored in latch 9 are user defined points which are supplied by a software modification by the user. These user defined points can be made available for any purpose.

Latch 8 has its outputs connected through buffers 10 through 13 to light emitting diodes D1 through D4 respectively. Latch 9 has its outputs connected through buffers 14 through 17 to light emitting diodes D5 through D8 respectively. The outputs of latch 8 are further connected to NAND gates 18 through 21. The outputs of latch 9 are connected to NAND gates 22 through 25.

Switch SW5 selects a logic 0 or logic 1 to be used as an enabling signal to gate 26. In the position shown in FIG. 1, switch SW5 will place a logic 0 at the input of gate 26. Gate 26 will invert the signal and enable each of the NAND gates 22 through 25. When switch SW5 is in the opposite position to that shown, the output of gate 26 will be logic 0 and gates 22 through 25 will be disabled and the output of gate 27 will be at logic 1, thereby enabling gates 18 through 21. When gates 18 through 21 are enabled, any of the switches SW1, SW2, SW3, or SW4, which is connected to that particular gate will enable that signal to be gated onto common bus CB and transmitted through network 28 to the display meter 99. This signal is a periodic wave whose voltage is alternating between a value of zero volts and five volts. The percentage of real time that this signal is at five volts corresponds to the percentage of time that real time is being consumed by one of the tasks selected by switches SW1-SW4. The duty cycle of the signal applied to meter 99 determines the DC component of the signal driving meter 99. Meter 99 is an analog movement meter. Thereby, the greater duration of time that bits are set in latch 8 for switches SW1-SW4, which are set to select those data bits, the higher the meter 99 will read in percentage. The real times for the four categories of software tasks may be summed in this manner or any categories, which are not desired, may be switched to the opposite position; and, not added into the displayed percentage.

Similarly, the user defined points stored in latch 9 are transmitted through gates 22 through 25 and any switches SW1 through SW4, which are enabled, will place these signals on the common bus CB. The duration of time for which the selected user defined points are set, will then be transmitted via the common bus CB through network 28 and displayed on meter 99, similar to that of predefined software tasks. Again, any user defined points which are not desired to be summed into the real time display may be switched to the opposite position and, therefore, not added to the sum displayed on the meter 99.

One of the eight data bits, made available by the processor, has been designated as the data bit to be turned on at the beginning of each ten millisecond cycle of the software of the switching system. This bit is the TRIG output signal of latch 8 which is connected to monostable 29. The first software task, which gets control in every 10 millisecond cycle, sets this bit. This bit controls the initiation of the overshoot timers, which are implemented by monostables 29 through 33. At the beginning of each ten millisecond cycle of software operation, a hardware timer is initiated by the software. This timer measures the amount of time from the beginning of one cycle to the beginning of the next ten millisecond cycle. If the amount of time is greater than 500 microseconds past the time which the next ten millisecond cycle should have started, one of three different panel lamps will be lit to indicate this condition. A lamp will be lit, if the excess time or overshoot is greater than 500 microseconds and less than 1000 microseconds; another lamp will be lit if this overshoot time is greater than 1000 microseconds and less than 2000 microseconds; and, a third lamp will be lit if the overshoot time is greater than 2000 microseconds.

Figure 2:
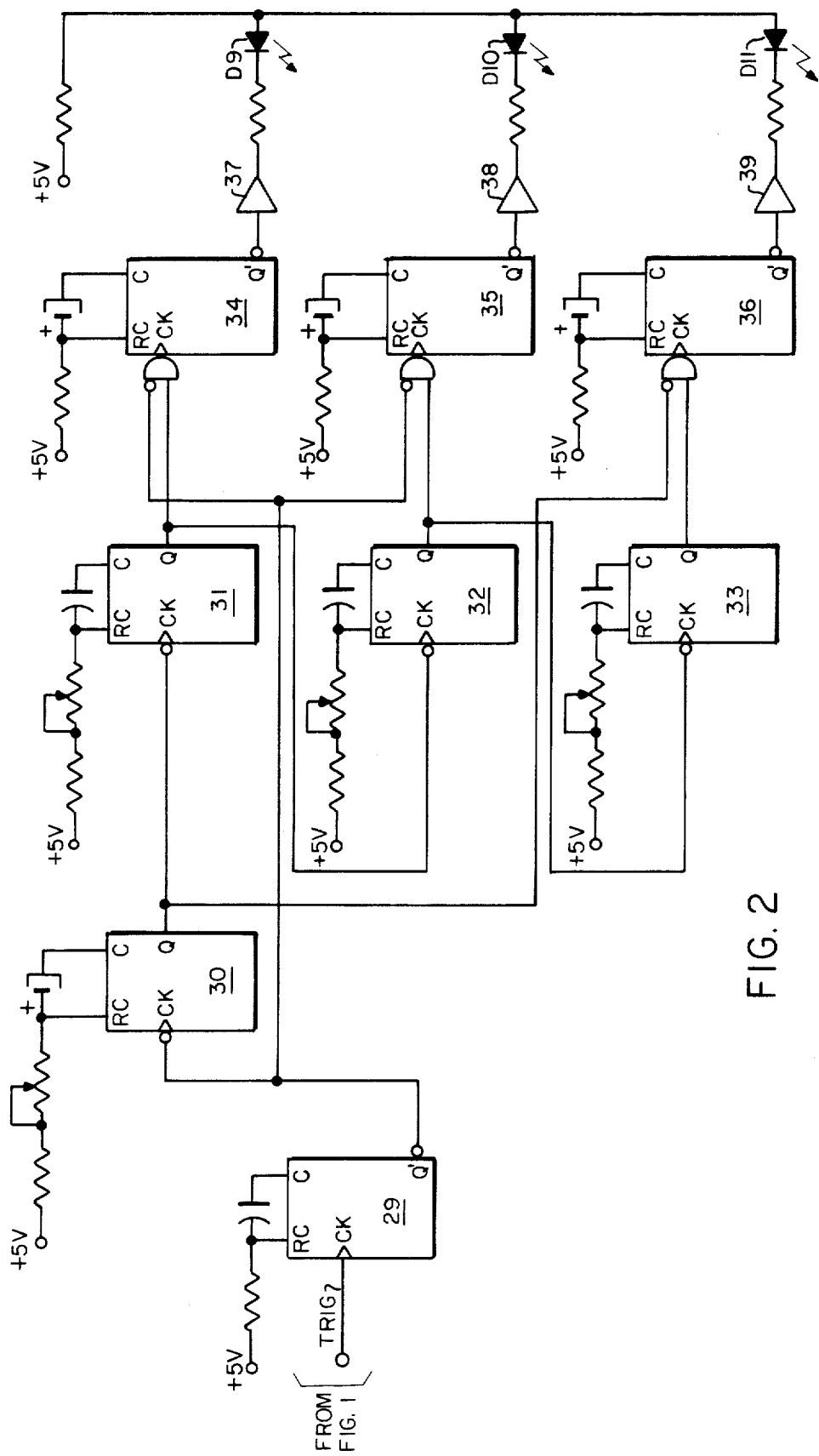
FIG. 2 is a schematic diagram of the timing logic for the overshoot indicator lamps.

Referring to FIG. 2, monostable multivibrator 29 is connected between latch 8 and monostable multivibrator 30. The function of monostable 29 is to present on a very narrow pulse to the remainder of the timing network. The duration of this pulse is set at two microseconds. The Q' duration of monostable 30 is set at 10.5 milliseconds, therefore, if the software task does not overshoot its allotted time slot of 10 milliseconds, by more than 500 microseconds, this timer will not expire. If this timer does expires, it will present a falling edge pulse to monostable 31. In response, monostable 31 will begin a timing cycle of 0.5 milliseconds. When monostable 31 expires it will present a falling edge pulse to monostable 32. Monostable 32 will begin a timing cycle of 1 millisecond. When monostable 32 expires, it will present the falling edge of monostable 33, which will begin timing a cycle of 2 microseconds.

The Q' output of monostable 29 is connected to monostable 30 and to monostables 34 and 35. The Q output of monostable 30 is connected to monostable 31 and to monostable 36. The Q output of monostable 31 is connected both to monostable 34 and monostable 32. The Q output of monostable 32 is connected both to monostable 35 and monostable 33.

As a result, when 500 microseconds of overshoot time has elapsed, but less than 1000 microseconds, monostable 34 will produce its Q' output due to both its inputs, Q' from monostable 29 and Q from monostable 31, being true at the same time. This output will be transmitted through buffer 37 to light LED D9. When 1000 microseconds of overshoot time has elapsed, but less than 200 microseconds, monostable 35 will produce its Q' output due to both of its inputs, Q' from monostable 29 and Q from monostable 32, being true at the same time, which will be transmitted through buffer 38 to light LED D10. When 2000 microseconds of overshoot time has elapsed, monostable 36 will produce its Q' output due to both of its inputs, Q from monostable 30 and Q from monostable 33, being true at the same time which will be transmitted through buffer 39 to light LED D11.

When the 2 microsecond timer expires, monostable 33 will, via its Q output, present a falling edge pulse to timer 36, which will activate a one-half second interval of LED D11. In addition, monostable 30 has its Q output connected to monostable 31. Monostable 31 has an output duration of 0.5 milliseconds. The Q output of monostable 31 is connected to monostable 34 and monostable 32 and will time a 500 microsecond overshoot interval. The Q output of monostable 31 will enable monostable 34 to light LED D9, if the initialization of the next time cycle, indicated by monostable 29 Q' output going low, while monostable 31 Q output is high. For an overshoot of 1000 microseconds, the Q output of monostable 31 will enable monostable 32, which has a one millisecond duration. Monostable 32 is connected to monostable 35 and will enable monostable 35 to light LED D10, if the initialization of the next time cycle, indicated by monostable 29 Q' output going low, while monostable 32 Q ouptut is high.

After timer 32 expires, timer 33 will be initiated and expire 2 microseconds later. This will turn on LED D11, indicating a 2000 microsecond overshoot.

Figure 3:
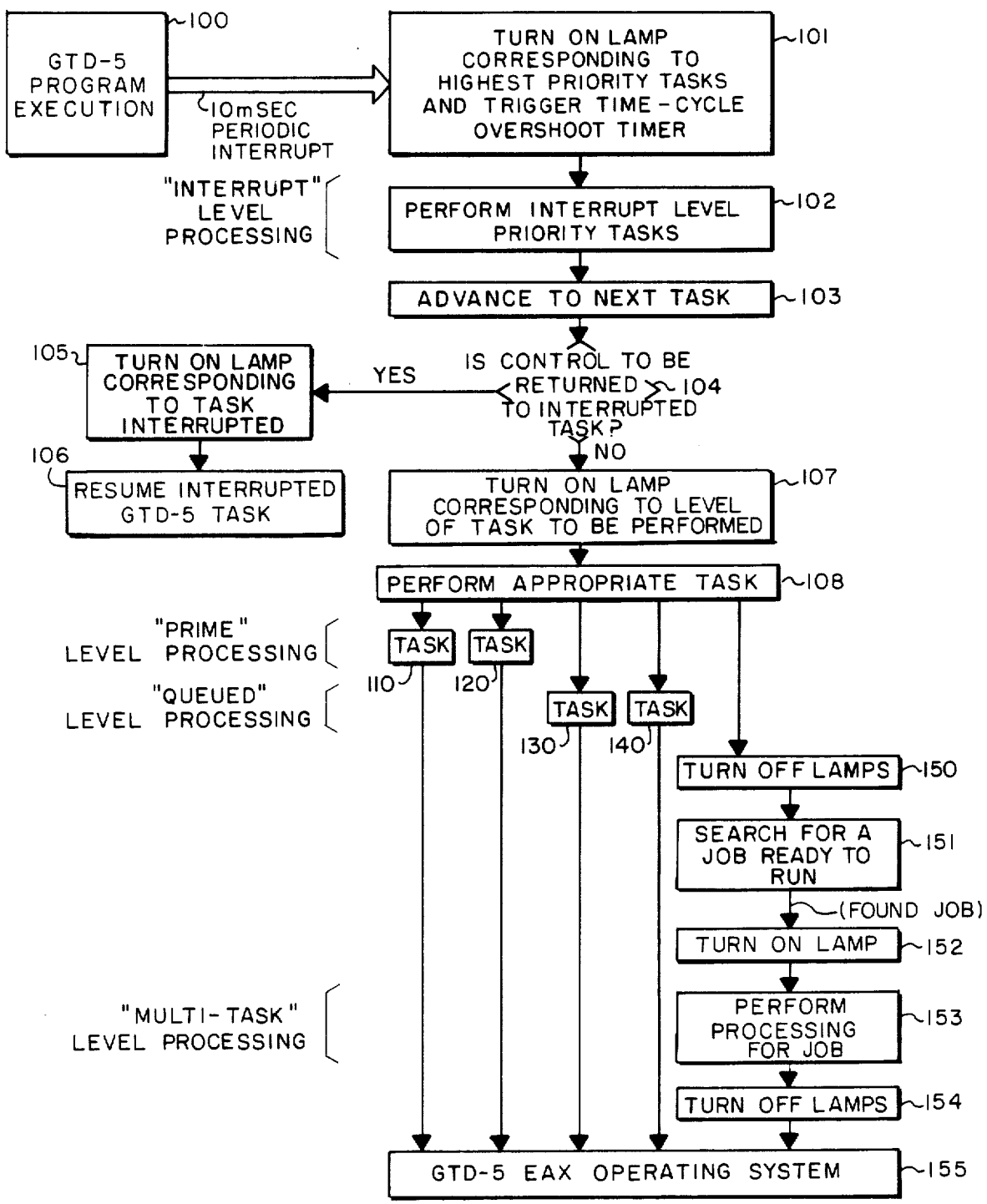
FIG. 3 is a logic flow diagram of the software of the present invention.

Referring to FIG. 3, every 10 milliseconds of GTD-5 program execution 100, the operation system receives control from a hardware interrupt and as a result turns on lamp corresponding to the highest priority tasks and re-triggers the time cycle overshoot timer, performed in block 101. The tasks are performed in a predefined order. Interrupt level tasks have the highest priority and are performed first; prime level processing is performed next; queued level processing is performed after that; and multitask level processing last.

Next, block 102 is performed, which gives control to any interrupt level priority tasks which need to be performed. This is termed interrupt level processing. After all these tasks have been performed block 103 calls for advancing to the next type task.

Block 104 determines whether control is to be returned to the interrupted task. If control is to be returned to the interrupted task, indicated by a yes answer this question, block 105 turns on the lamp corresponding to the interrupted task and gives control to block 106 task via the GTD-5 program.

If control was not to be returned to the interrupted task, block 107 is executed which turns on the lamp corresponding to the level of task to be performed. Next, block 108 actually performs the appropriate task. For example, prime level processing task 110 would be given control first. When this task was complete, entry would be made through the above logic and block 108 would give prime level task 120 control.

Block 108 would next give queued level task 130 control. When task 130 had completed, it would transfer control to the GTD-5 EAS operating system block 155. Again, entry would be made through the above logic and queued level task 140 would be given control. When task 140 had completed and returned control to the operating system block 155, multitask level processing would then proceed. Multitask level processing is the lowest level of processing. When all interrupt level, prime level, and queued level jobs have been completed, block 108 would perform multitask processing and transfer control to block 150. Block 150 turns off all lamps. Next, block 151 will search for a job which is ready to run. Since this may take some time, permitting the light to be lit previously would give a false reading. Once job is found, block 152 will turn on multitask lamp. Then, block 153 will perform processing for this job. When this is complete, block 154 will turn off the lamps and exit to the GTD-5 EAS operating system block 155.

One lamp on the control panel corresponds to each of the processing levels. That is, one lamp corresponds to interrupt level processing; one lamp corresponds to prime level processing; one lamps corresponds to queued level processing; and one lamp corresponds to multitask level processing. The additions that were made for the present invention to the processing software comprise blocks 101, 105, 107, 150, 152, and 154.

Figure 4:
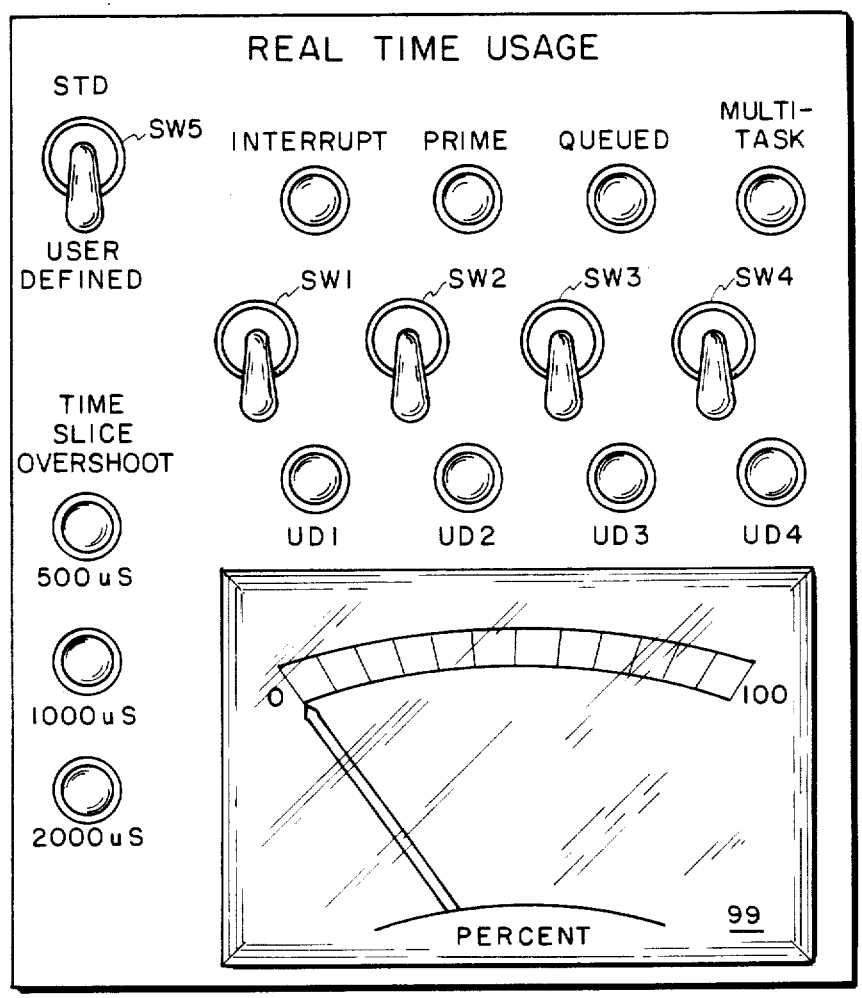
FIG. 4 is a layout of the panel of the real time usage meter of the present invention.

Referring to FIG. 4, the display panel of the present invention is shown. Switch SW5 indicates whether standard real time usage indicators or the user defined indicators are to be displayed on meter 99. The standard real time indicators are the interrupt level lamp, the prime level lamp, the Q level lamp and the multitask level lamp. Switches SW1 through SW4 effectively select which combination of these four standard real time usage indicators is to be displayed. Also multiple switches which are enabled select and cause the selected tasks to be added together and displayed on the percentage meter 99. The time slide overshoot lamps for 500 microseconds, 1000 microseconds and 2000 microseconds are shown displayed at the left side of the panel.

If switch SW5 is selected for user defined, each of the switches SW1 through SW4 select four user defined indicators for display on lamps UD1 through UD4 and may be added as explained for the standard tasks and displayed on percentage meter 99.

Although a preferred embodiment of the invention has been illustrated and that form described in detail, it will be readily apparent to those skilled in the art that various modifications may be made therein, without departing from the spirit of the invention or from the scope of the appended claims.

What is claimed is:

1. A real time usage meter for measuring the execution time of processing system software, said real time usage meter comprising:
   display means providing for visual display;
   means for indicating being periodically transmitted by said processing system, said means for indicating including a status display word having a plurality of status bits, each status bit indicating the execution of a particular type of software task;
   means for storing connected to said processing system, said means for storing being cyclically operated to store said status display data word;
   gating means connected to said means for storing and to said display means, said gating means being cyclically operated to transmit said stored status display data word, indicating an instantaneous execution of said types of software tasks, to said display means for visual display, said cyclic transmission of said status bits over a predetermined period of time representing said execution time of said software tasks; and
   switching means connected between said gating means and said display means, said switching means being operated in response to said status display data word to selectively transmit predetermined ones of said status bits to said display means for visual display.

2. A real time usage meter as claimed in claim 1, said display means includes percentage meter means connected to said switching means.

3. A real time usage meter as claimed in claim 2, said display means further includes a plurality LED devices, each said LED device connected to said gating means.

4. A real time usage meter as claimed in claim 3, wherein said means for indicating includes means for setting being operated to set each of said plurality fo status bits corresponding to one of said plurality of LED devices.

5. A real time usage meter as claimed in claim 4, wherein said means for indicating includes means for resetting being operated to reset each of said plurality of status bits corresponding to one of said plurality of LED devices.

6. A real time usage meter as claimed in claim 5, wherein said means for storing includes second gating means connected to said processor system, via an address bus, a data bus, and input/output leads, and second gating means operated to produce first and second latching signals.

7. A real time usage meter as claimed in claim 6, wherein said means for storing further includes latching means connected to said second gating means, said latching being operated in response to said first and second latching signals to store said status display data word.

8. A real time usage meter as claimed in claim 7, wherein said latching means includes at least first and second multiple-bit latching devices.

9. A real time usage meter as claimed in claim 8, wherein said means for storing further includes a plurality of buffering devices, each said buffering device connected between said latching devices and a corresponding one of said plurality of LED devices.

10. A real time usage meter as claimed in claim 9, wherein said gating means includes a plurality of NAND gating devices connected between said latching devices and said switching means, each NAND gating device operated to transmit one said status bit.

11. A real time usage meter as claimed in claim 10 wherein said switching means includes a plurality of single-throw-double-pole switches, each said switch connected between said first latching device and said second latching device via said NAND gating devices, each said switch being operated to select a status bit of said first latching device or to select a status bit of said second latching device.

12. A real time usage meter as claimed in claim 11, wherein said switching means further includes an enabling single-throw-double-pole switch connected to said NAND gating devices to enable said status bits of said first latching device or to enable said status bits of second latching device to be transmitted.

13. A real time usage meter as claimed in claim 12, wherein there is further included common bus means connected to said plurality of single-throw-double-pole switches for selectively ORing said plurality of status bits from said first latching device or for selectively ORing said plurality of status bits from said second latching device.

14. A real time usage meter as claimed in claim 13, wherein there is further included network means connected between said common bus means and said percentage meter means, said network means being operated to drive said percentage meter means to indicate the real time of each of said enabled status bits.

15. A real time usage meter as claimed in claim 2, wherein said percentage meter means includes an analog movement percentage meter.

16. A real time usage meter as claimed in claim 6, said second gating means including:
   first NOR gating means connected to said processor system via said input/output leads; and
   first NAND gating means connected to said first NOR gating means and to said processor system via said address bus.

17. A real time usage meter as claimed in claim 16, wherein said second gating means further includes second NOR gating means connected to said first NAND gating means and to said processor system via said input/output leads.

18. A real time usage meter as claimed in claim 17, wherein said second gating means further includes second NAND gating means connected to said processor system via said data bus.

19. A real time usage meter as claimed in claim 18, wherein said second gating means further includes third NAND gating means connected to said processor system via said data bus, to said second NOR gating means and to said latching means.

20. A real time usage meter as claimed in claim 18, wherein said second gating means further includes fourth NAND gating means connected to said second NAND gating means, to said second NOR gating means and to said latching means.

* * * * *